United States Patent
Hoffer et al.

(10) Patent No.: US 9,623,495 B2
(45) Date of Patent: Apr. 18, 2017

(54) CUTTING INSERT WITH ASYMMETRIC CUTTING EDGE

(71) Applicant: Kennametal Inc., Latrobe, PA (US)

(72) Inventors: Brad Daniel Hoffer, White, PA (US); Jeffrey Francis Kovac, Loyalhanna, PA (US)

(73) Assignee: KENNAMETAL INC., Latrobe, PA (US)

( * ) Notice: Subject to any disclaimer, the term of this patent is extended or adjusted under 35 U.S.C. 154(b) by 221 days.

(21) Appl. No.: 14/506,749

(22) Filed: Oct. 6, 2014

(65) Prior Publication Data
US 2016/0096228 A1   Apr. 7, 2016

(51) Int. Cl.
B23C 5/06   (2006.01)
B23C 5/20   (2006.01)

(52) U.S. Cl.
CPC ............... *B23C 5/207* (2013.01); *B23C 5/06* (2013.01); *B23C 2200/0455* (2013.01); *B23C 2200/205* (2013.01)

(58) Field of Classification Search
CPC ........ B23C 2200/203; B23C 2200/206; B23C 2200/208; B23C 2210/08; B23C 2210/088
See application file for complete search history.

(56) References Cited

U.S. PATENT DOCUMENTS

| | | |
|---|---|---|
| 5,951,214 A | 9/1999 | Rothballer et al. |
| 7,252,461 B2 | 8/2007 | Karonen |
| 8,641,331 B2 * | 2/2014 | Zastrozynski ............ B23C 5/06 407/113 |
| 2007/0071559 A1 | 3/2007 | Koskinen |
| 2008/0232912 A1 * | 9/2008 | Bhagath .................... B23C 5/06 407/114 |
| 2009/0155004 A1 | 6/2009 | Jansson |
| 2012/0057943 A1 | 3/2012 | Zastrozynski et al. |
| 2014/0126970 A1 * | 5/2014 | Maeta ....................... B23C 5/06 407/114 |
| 2014/0341660 A1 * | 11/2014 | Cheon ....................... B23C 5/06 407/42 |

FOREIGN PATENT DOCUMENTS

| | | |
|---|---|---|
| CN | 1443619 A | 9/2003 |
| DE | 9320448 U1 | 7/1994 |
| EP | 457488 A1 | 11/1991 |
| EP | 502541 A1 | 9/1992 |
| EP | 672492 A1 | 9/1995 |
| JP | 08300214 A | 11/1996 |
| JP | 09207007 A | 8/1997 |
| JP | 11179611 A | 7/1999 |
| JP | 2004001219 A | 1/2004 |
| WO | 9635538 A1 | 11/1996 |

* cited by examiner

*Primary Examiner* — Will Fridie, Jr.
(74) *Attorney, Agent, or Firm* — Matthew S. Bedsole

(57) ABSTRACT

A cutting insert for a cutting tool is described. The cutting inserts generally square-shaped with two opposing surfaces and four peripheral side surfaces. Cutting edges are formed at the intersection between the first and second surfaces and the peripheral side surfaces. Each cutting edge is divided into a first portion, a second portion and a radius blend. The first portion has a length, L1, and the second portion has a length, L2, that is shorter than the first portion such that the radius blend is not located at a midpoint of the cutting edge, thereby increasing a height of the ninety-degree shoulder that can be cut by the cutting insert.

15 Claims, 7 Drawing Sheets

CUTTING INSERT WITH ASYMMETRIC CUTTING EDGE

FIELD OF THE INVENTION

In general, the invention relates to a cutting insert and a cutting tool, and in particular to a isometrically-mounted, double-sided, square, indexable cutting insert for a milling cutter having linear cutting edges and curved cutting corners.

BACKGROUND OF THE INVENTION

Milling cutters are required to be fitted with cutting inserts that have a main cutting edge for milling a ninety-degree shoulder in a workpiece. When clamped, the cutting inserts project both beyond the end face of the rotatable tool holder and also laterally in order to be able to both produce the vertical wall parts and finish the cut bed wall. In most milling cutters, the height of the shoulder that can be achieved is limited by the length of the main cutting edge, especially in cutting inserts that are not square in shape.

SUMMARY OF THE INVENTION

The problem of increasing the height of the shoulder that can be cut for a cutting insert is solved by providing a cutting insert with an asymmetric cutting edge with respect to the central, longitudinal axis of the cutting insert.

In one aspect of the invention, a cutting insert comprises two opposing end surfaces, a first surface and an opposing, second surface. The first and second surfaces are substantially identical to each other. Four peripheral side surfaces extends entirely between the first and second surfaces. The four peripheral side surfaces are substantially identical to each other. Four curved corners extend entirely between the first and second surfaces and adjacent peripheral side surfaces. Four cutting edges are formed at the intersection between the first surface and the peripheral side surfaces, and four cutting edges are formed at the intersection between the second surface and the peripheral side surfaces. Each cutting edge is divided into a first portion and a second portion with a radius blend separating the first and second portions. The cutting insert is symmetric about a first central axis, A1, passing through the two opposing side peripheral surfaces, a second central axis, A2, passing through the other two opposing side peripheral surfaces, and a third central axis, A3, passing through the first and second surfaces. The first central axis, A1, is perpendicular to the second central axis, A2, and the third central axis, A3, is perpendicular to the first central axis, A1, and to the second central axis, A2. The first portion has a length, L1, and the second portion has a length, L2, that is shorter than the first portion such that the radius blend is not located at a midpoint of the cutting edge.

In another aspect, a milling cutter comprises a cutter body with a plurality of insert pockets, and a cutting insert of the invention is seated in each of the plurality of insert pockets.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
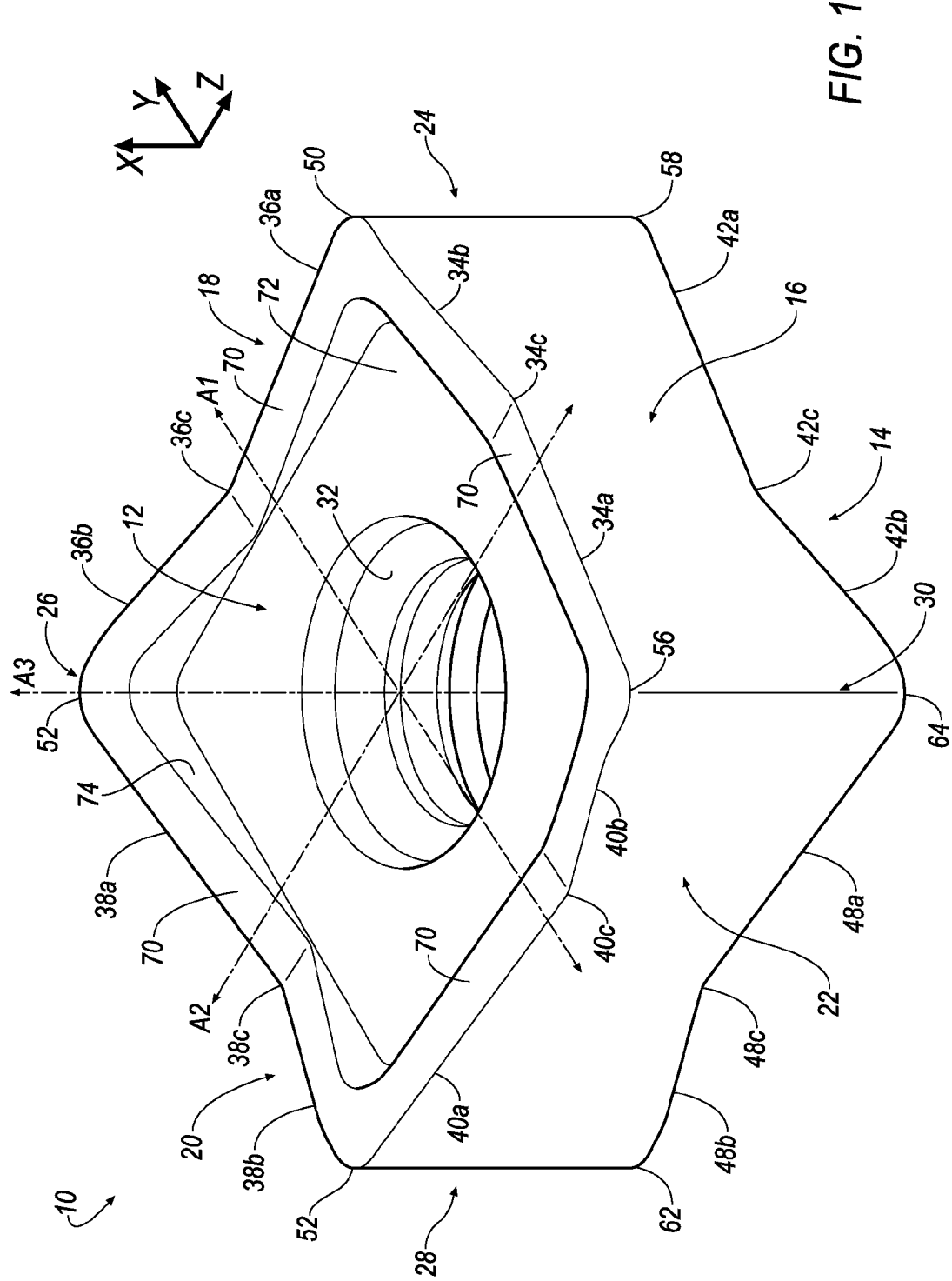
FIG. 1 is an isometric view of an exemplary embodiment of a cutting insert of the invention.
Figure 2:
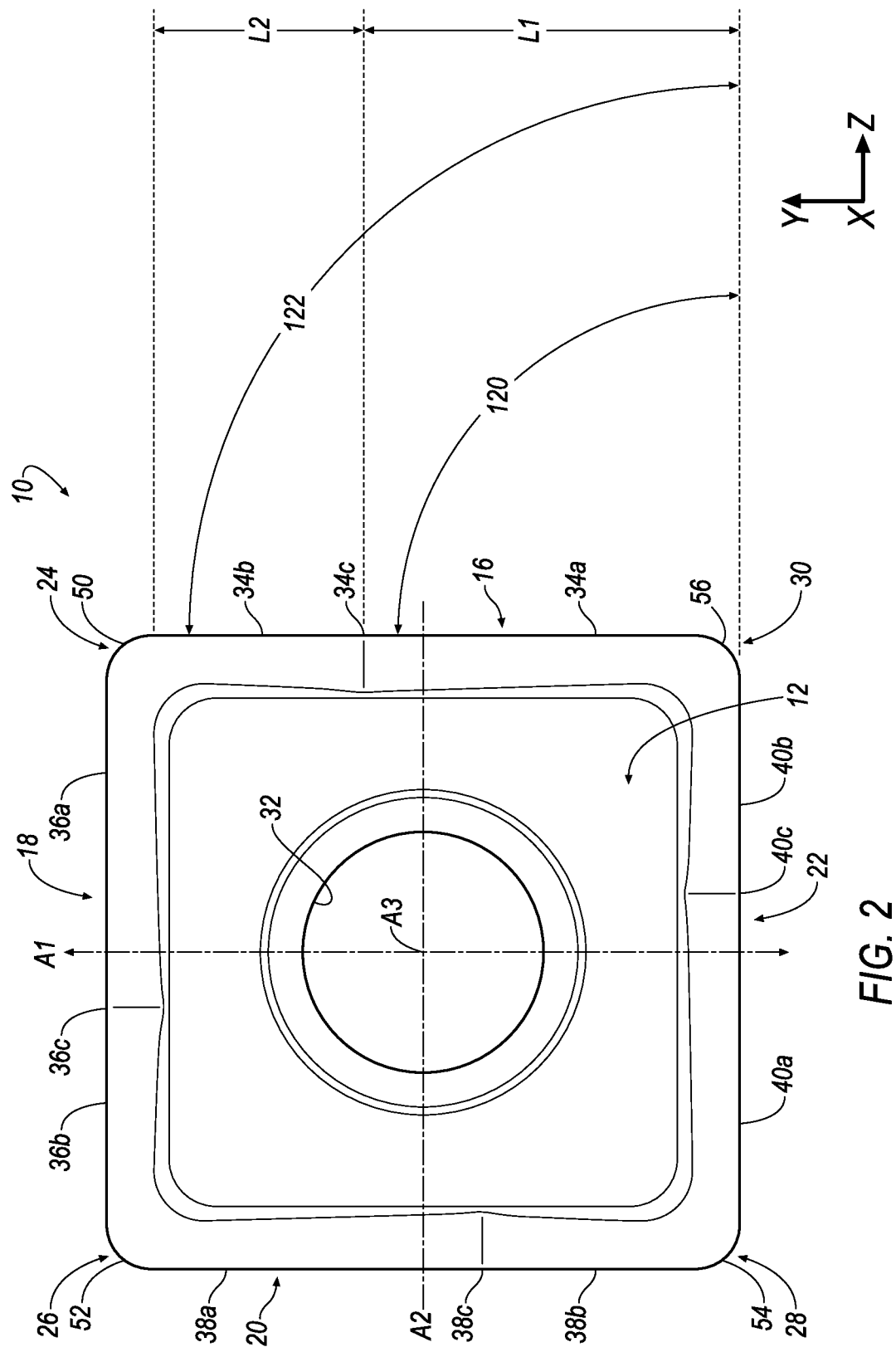
FIG. 2 is a top view of the exemplary embodiment of the cutting insert of FIG. 1.
Figure 3:
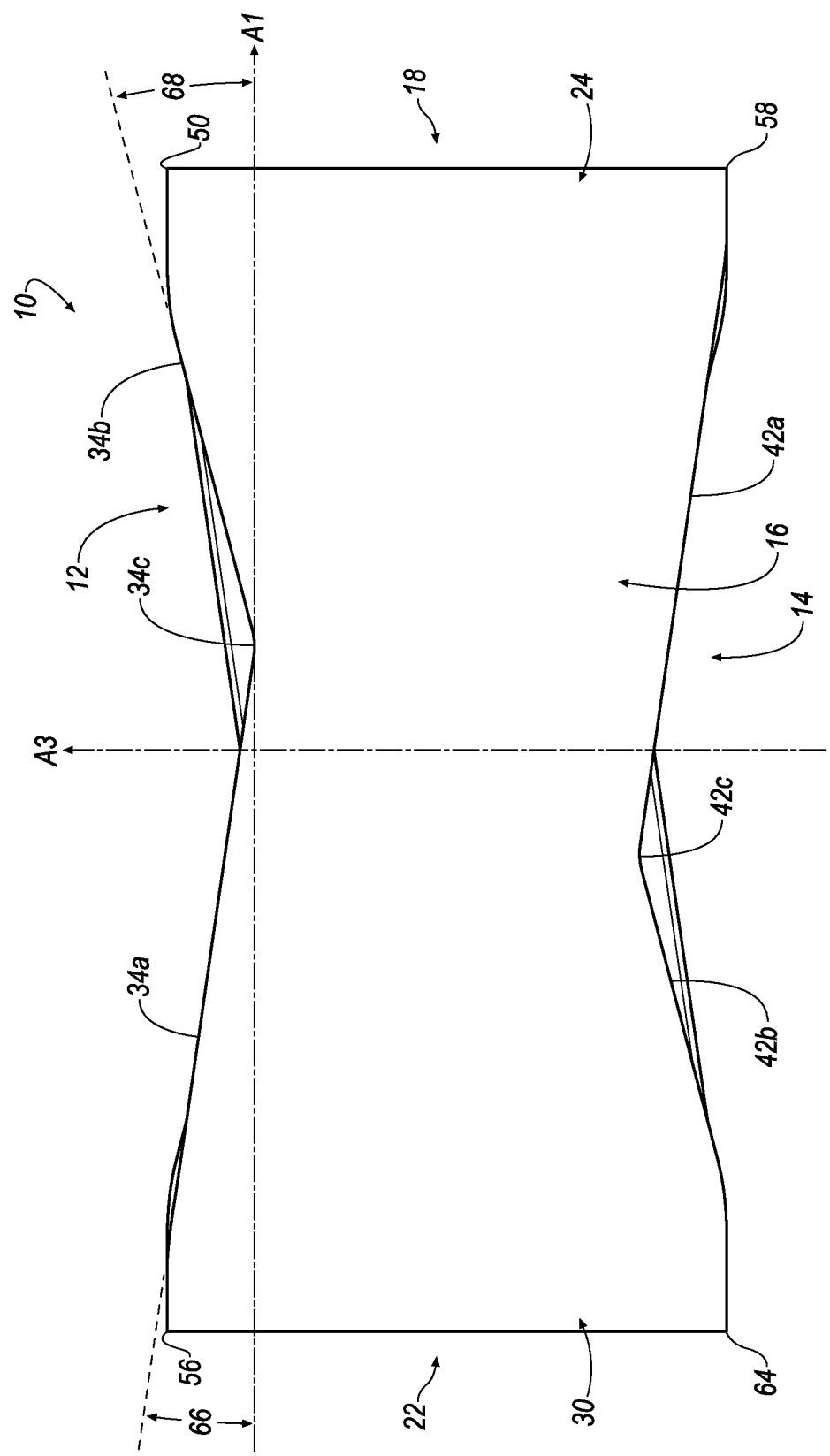
FIG. 3 is a side view of the exemplary embodiment of the cutting insert of FIG. 1.
Figure 6:
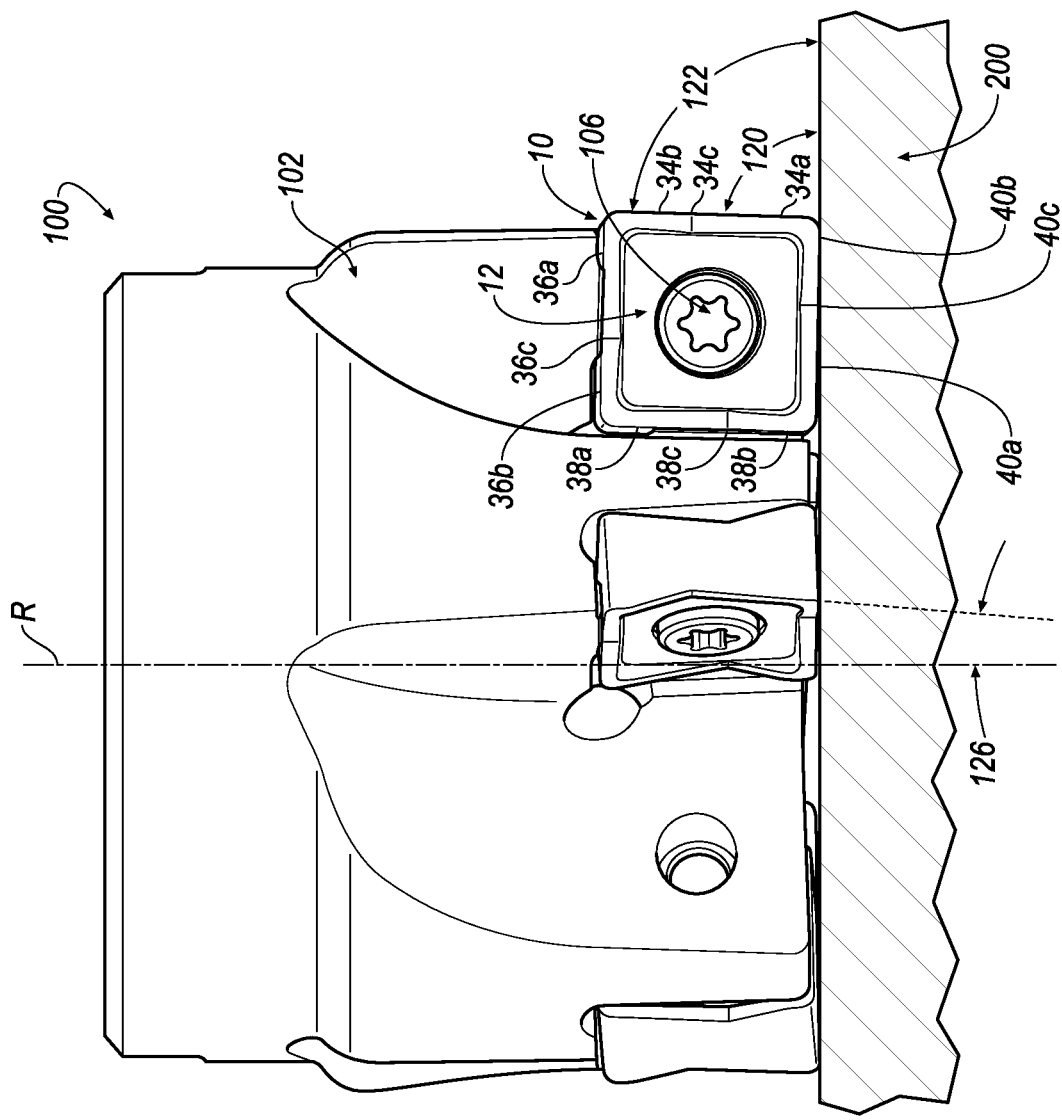
FIG. 6 is a side view of the exemplary embodiment of the cutting tool of FIG. 4 with the cutting insert of FIG. 1 mounted in the insert pocket.

Referring now to FIGS. 1-3, a cutting insert 10 is shown according to an embodiment of the invention. In general, the cutting insert 10 is double-sided, indexable and isometric. The cutting insert 10 is typically manufactured by form-pressing and sintering carbide powders using methods well-known in the art. The cutting insert 10 is generally square in shape and has two identical opposing first and second surfaces 12, 14, and four peripheral side surfaces 16, 18, 20, 22 extending entirely between the first and second surfaces 12, 14. The first and second surfaces 12, 14 are substantially identical to each other, and the four peripheral side surfaces 16, 18, 20, 22 are substantially identical to each other. The cutting insert 10 also includes four curved corners 24, 26, 28, 30 extending entirely between the first and second surfaces 12, 14 and adjacent peripheral side surfaces 16, 18, 20, 22. The first and second surfaces 12, 14 include a countersunk bore 32 that extends entirely through the cutting insert 10. The countersunk bore 32 is capable of receiving a mounting screw 106 for mounting the cutting insert 10 to a cutting tool 100 (FIG. 6).

The cutting insert 10 is symmetric about a first central axis, A1, passing through the two opposing side peripheral surfaces 18, 22, a second central axis, A2, passing through the other two opposing side peripheral surfaces 16, 20, and a third central axis, A3, passing through the first and second surfaces 12, 14. The first central axis, A1, is perpendicular to the second central axis, A2, and the third central axis, A3, is perpendicular to the first central axis, A1, and to the second central axis, A2. The first central axis, A1, is in the direction of the y-axis, the second central axis, A2, is in the direction of the z-axis, and the third central axis, A3, is in the direction of the x-axis. The third central axis, A3, can also be considered the central, longitudinal axis of the cutting insert 10 passing through the countersunk bore 32 of the cutting insert 10.

The cutting insert 10 has four cutting edges 34, 36, 38, 40 formed at the intersection between the first surface 12 and the peripheral side surfaces 16, 18, 20, 22, respectively. The cutting insert 10 also has four cutting edges 42, 44, 46, 48 formed at the intersection between the second surface 14 and the peripheral side surfaces 16, 18, 20, 22, respectively. The first and second axes, A1 and A2, pass through the midpoint of each cutting edge 34, 36, 38, 40, 42, 44, 46, 48. It is noted that the cutting edges 44, 46 are not visible in FIG. 1, but one skilled in the art would clearly understand that the cutting edges 44, 46 are present because the cutting insert 10 is symmetric about all three axes (A1, A2 and A3). Thus, the cutting insert 10 has a total of eight (8) cutting edges.

As shown in FIG. 3, each cutting edge 34, 36, 38, 40, 42, 44, 46, 48 is divided into a first portion and a second portion with a radius blend separating the first and second portions. For example, the cutting edge 34 includes a first portion 34a, a second portion 34b and a radius blend 34c separating the first portion 34a and the second portion 34b. In another example, the cutting edge 42 includes a first portion 42a, a second portion 42b and a radius blend 42c separating the first portion 42a and the second portion 42b. Because all the cutting edges 34, 36, 38, 40, 42, 44, 46, 48 are identical to each other, only the cutting edge 34 will be discussed below for brevity.

As shown in FIG. 2, the first portion 34a has a length, L1, and the second portion 34b has a length, L2, that is shorter than the first portion 34a. In other words, the length, L1, of the first portion 34a is longer than the length, L2, of the second portion 34b. As a result, the radius blend 34c is not located at the midpoint of the cutting edge 34 (i.e., along the central axis, A2), but rather is located at a point not at the midpoint of the cutting edge 34. The first portion 34a having the length, L1, that is greater than the length, L2, of the second portion 34b with the radius blend 34c not located at the midpoint of the cutting edge 34 enables the cutting insert 10 to cut a ninety-degree shoulder in the workpiece with a greater height as compared to a conventional cutting insert.

Referring now to FIG. 3, the profile of the cutting edge 34 is asymmetrical with respect to the central axis, A3, passing through the countersunk bore 32 of the cutting insert 10. Specifically, the first portion 34a continuously slopes downward from the curved corner 30 to the radius blend 34c at a first angle 66 with respect to the central axis, A1 (i.e. perpendicular to the central axis, A3), and the second portion 34b continuously slopes upward at a second angle 68 with respect to the central axis, A1, from the radius blend 34c to the curved corner 24 on the same peripheral side surface 16. The first angle 66 is different than the second angle 68. Specifically, the first angle 66 is smaller in magnitude than the second angle 68 (i.e., the second angle 68 is larger in magnitude than the first angle 66). In one embodiment, the first angle 66 is in a range between about five (5) degrees to about fifteen (15) degrees, and the second angle 68 is in a range between about ten (10) degrees and about twenty (20) degrees. For example, the first angle 66 can be about ten (10) degrees, and the second angle 68 can be about fifteen (15) degrees. However, it will be appreciated that the invention can be practiced with any desirable first angle 66 and second angle 68, so long as the first angle 66 is smaller in magnitude than the second angle 68. The large first angle 66 enables the cutting insert 10 to perform cutting operations with lower cutting forces as compared to conventional cutting inserts.

The cutting insert 10 also has four curved, corner cutting edges 50, 52, 54, 56 formed at the intersection between the first surface 12 and the curved corners 24, 26, 28, 30, respectively. The cutting insert 10 also has four curved, corner cutting edges 58, 60, 62, 64 formed at the intersection between the second surface 14 and the curved corners 24, 26, 28, 30, respectively. It is noted that the curved, corner cutting edge 60 is not visible in FIG. 1, but one skilled in the art would clearly understand that the curved, corner cutting edge 60 is present because the cutting insert 10 is symmetric about all three central axes (A1, A2 and A3). Thus, the cutting insert 10 has a total of eight (8) corner cutting edges.

Referring to FIG. 1, the first surface 12 (and second surface 14) includes a rake surface 70 extending radially inward from each of the cutting edges 34, 36, 38, 40. In the illustrated embodiment, the rake surface 70 is formed substantially parallel to the central axes, A1 and A2. However, it will be appreciated that the rake surface 70 can be formed at an angle with respect to the central axes, A1 and A2, such that the rake surface 70 is higher in elevation at the cutting edge 34, 36, 38, 40 and slopes downward toward the countersunk bore 32. It will also be appreciated that the rake surface 70 can include chip-breaking features of the type known in the art.

The first surface 12 also includes a substantially planar seating surface 72 extending continuously from the rake surface 66 to the countersunk bore 32. The seating surface 72 is lower in elevation than the rake surface 70 such that a wall 74 extends upward from the seating surface 72 to rake surface 70. Because of the profile of the cutting edges 34, 36 38, 40 discussed above, the wall 74 has a minimum height proximate the radius blends 34c, 36c, 38c, 40c of the cutting edges 34, 36, 38, 40, and a maximum height proximate the curved corners 24, 26, 28, 30. It will be understood by one skilled in the art that because the cutting insert 10 is symmetric about all three axes, A1, A2 and A3 that the second surface 14 has identical rake and seating surfaces as the first surface 12, and therefore will not be discussed herein for brevity.

Referring now to FIGS. 4-7, a cutting tool 100, for example, a milling cutter, is shown according to an embodiment of the invention. The milling cutter 100 has a center axis of rotation R, and a cutter body 102 with a plurality of insert pockets 104. In the illustrated embodiment, the milling cutter 100 includes five (5) insert pockets 104. However, it will be appreciated that the invention is not limited by the number of pockets 104, and that the invention can be practiced with any desirable number of insert pockets 104, depending on the dimensions of the cutting tool 100.

The cutting insert 10 of the invention is isometrically seated in a respective insert pocket 104 of the cutter body 102 by means of a mounting screw 106. The insert pocket 104 includes a side wall 108, a rear wall 110 and a bottom wall 112. The rear wall 110 is generally transverse to the bottom wall 112. Each wall 108, 110, 112 is generally planar. When seated in the insert pocket 104, one of the peripheral side surfaces 16, 18, 20, 22 of the cutting insert 10 engages the side wall 108, and another one of the peripheral side surfaces 16, 18, 20, 22 of the cutting inset 10 engages the rear wall 110, and one of the first and second surface 12, 14 engages the bottom wall 112 of the insert pocket 104. The bottom wall 112 includes a threaded bore 114 for receiving the mounting screw 106 to mount the cutting insert 10 to the cutting tool 100.

Figure 4:
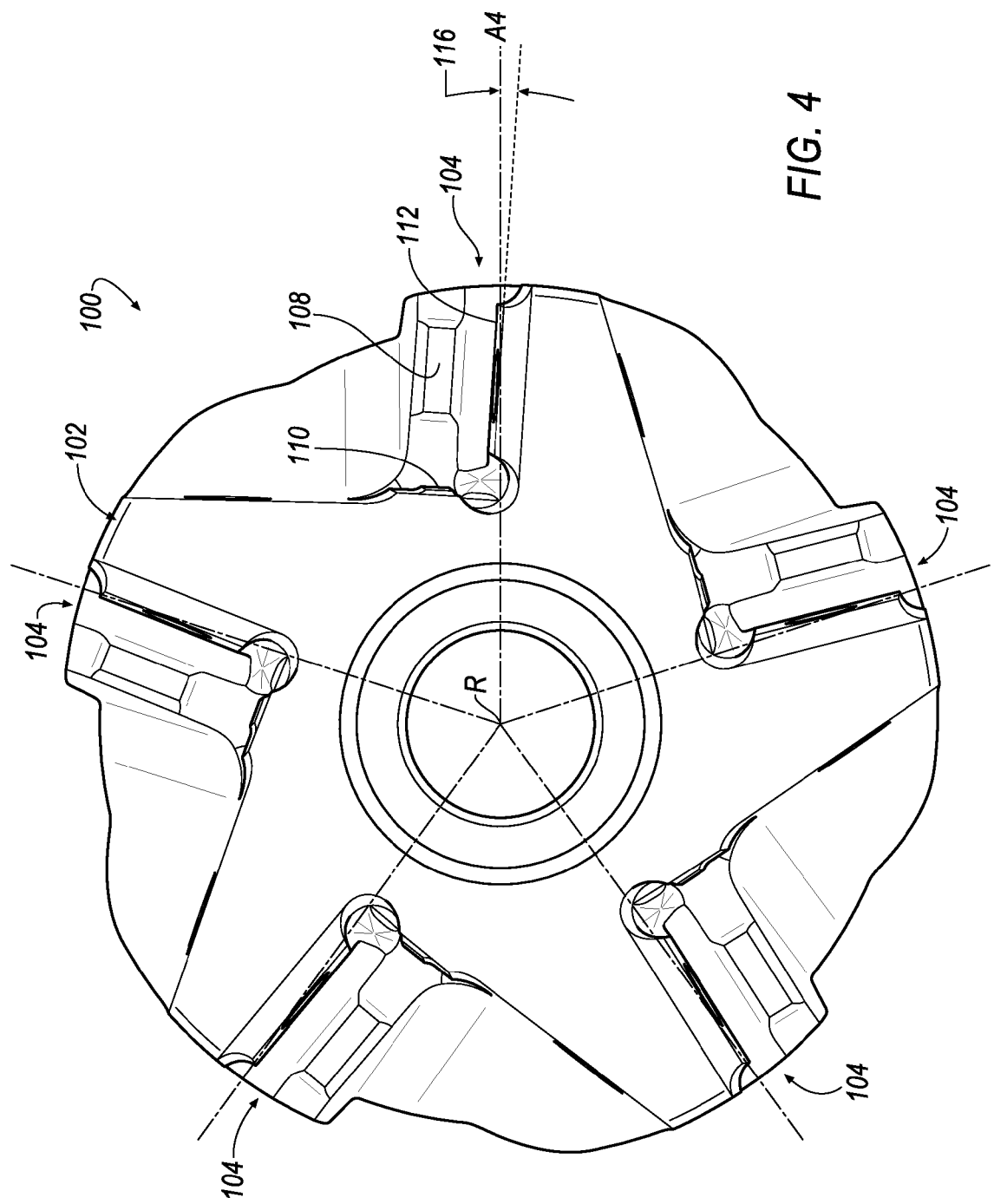
FIG. 4 is a front view of the exemplary embodiment of the cutting tool of the invention.
Figure 5:
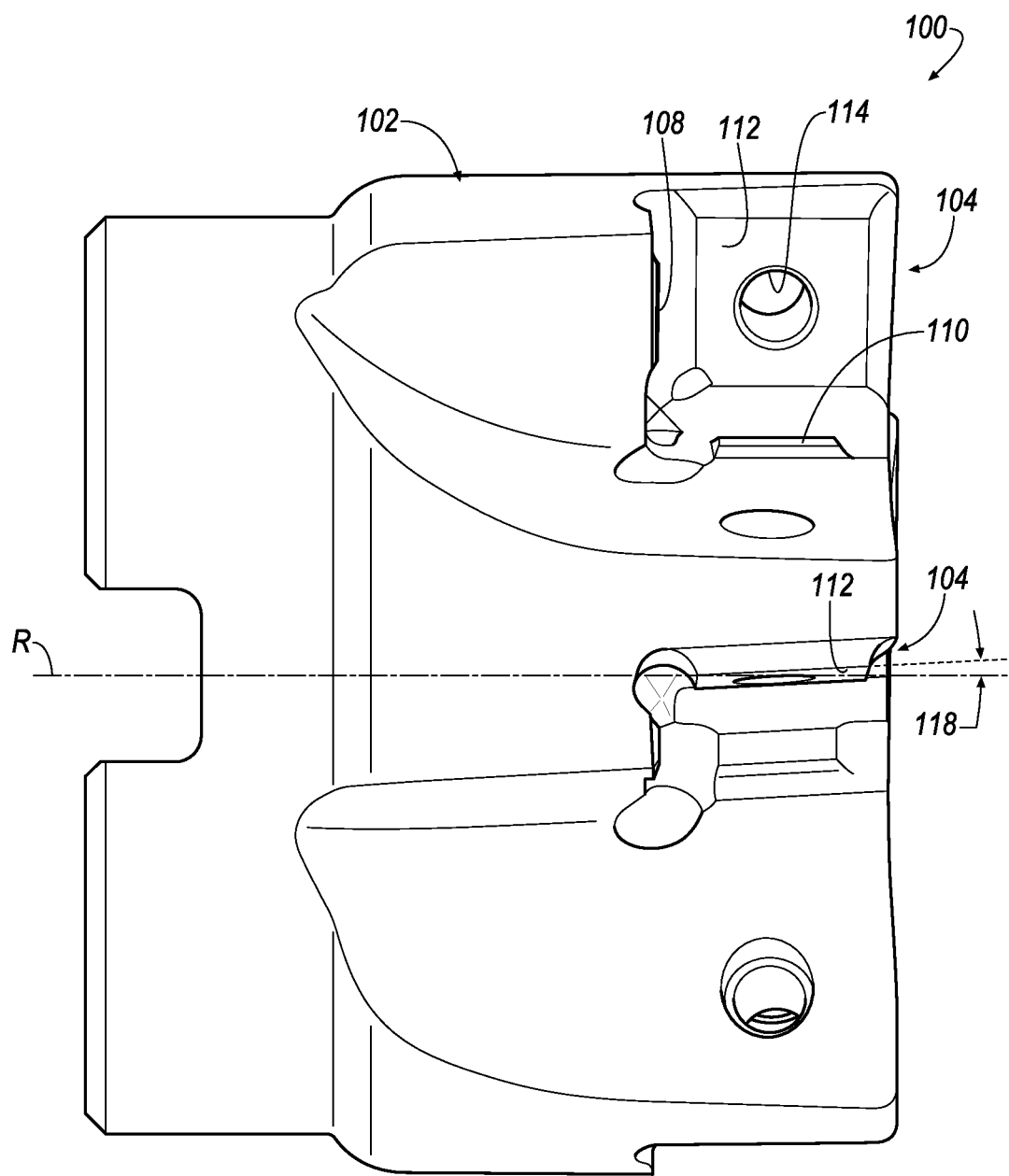
FIG. 5 is a side view of the exemplary embodiment of the cutting tool of FIG. 4.

As shown in FIG. 4, the bottom wall 112 is formed at a first angle 116 with respect to an axis, A4, that is perpendicular to the center axis of rotation, R. In one embodiment, the first angle 116 is between about two (2) degrees and about six (6) degrees. For example, the first angle 116 can be about four (4) degrees. As shown in FIG. 5, the bottom wall 112 is also formed at a second angle 118 with respect to the center axis of rotation, R. In one embodiment, the second angle 118 is between about one (1) degree and about five (5) degrees. For example, the second angle 118 can be about three (3) degrees.

Figure 7:
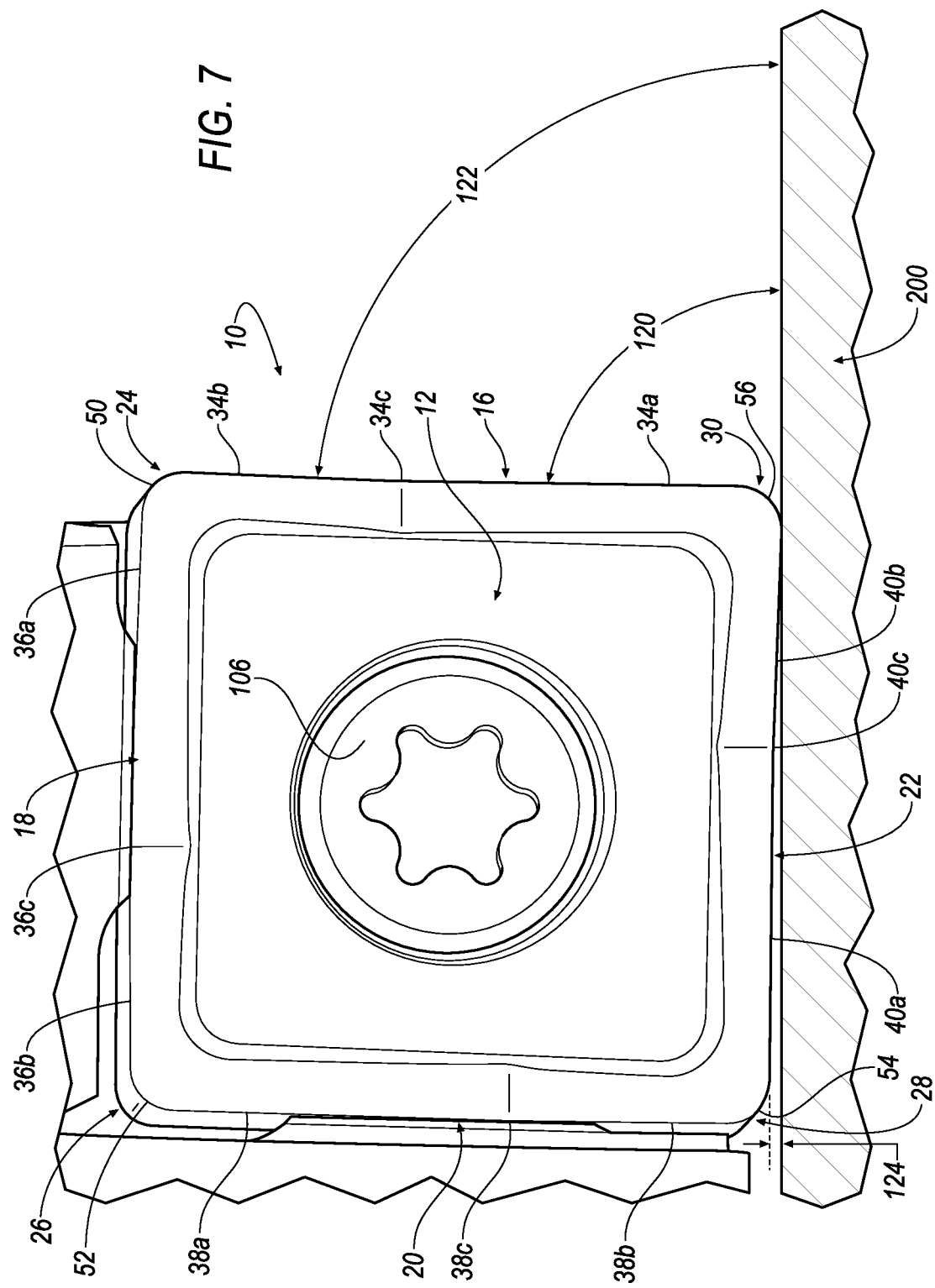
FIG. 7 is an enlarged view of the exemplary embodiment of the cutting tool of FIG. 4 with the cutting insert of FIG. 1 mounted in the insert pocket.

As shown in FIGS. 6 and 7, the first and second angles 116, 118 cause each cutting insert 10 to be seated in the insert pocket 104 such that the curved, cutting corner 26 of the cutting insert 10 is rotated to be closer (out of the paper) than the curved, cutting corners 24, 28, 30 and the curved cutting corner 30 is farther (into the paper) than the curved, cutting corners 24, 26, 28. As a result, the first portion 34a of the cutting edge 34 forms an angle 120 equal to ninety (90) degrees with respect to a workpiece 200, and the second portion 34b of the cutting edge 34 forms an angle 122 less than ninety (90) degrees with respect to the workpiece 200.

In the illustrated embodiment, the cutting insert 10 is mounted in the insert pocket 104 such that the first surface 12 is the "top" surface and the second surface 14 is the "bottom" surface that engages the bottom wall 112 of the insert pocket 104. Because the cutting inset 10 of the invention is a double-sided cutting insert, it will be appreciated that the cutting insert 10 can be mounted in the insert pocket 104 such that the first surface 12 is the "bottom" surface and the second surface 14 is the "top" surface. In addition, it should be understood that the cutting insert 10 is indexable such that each of the curved, corner cutting edges 50, 52, 54, 56 can become the active cutting edge when the first surface 12 is the "top" surface, and that each of the curved, corner cutting edges 58, 60, 62, 64 can become the active cutting edge when the second surface 14 is the "top" surface.

As mentioned above, the curved, corner cutting edge 56 engages the workpiece 200 during a cutting operation. As a result of the first and second angles 116, 118 of the insert pocket 104, a clearance 124 exists between the workpiece 200 and the cutting edge 40 proximate the curved, corner cutting edge 54 of the cutting insert 10. In addition, the high positive angle 66 of the first portion 34a of the cutting edge 34 (and also the cutting edges 36, 38, 40) causes the cutting insert 10 to be seated in the insert pocket 104 with a relative large positive inclination angle 126 (i.e. negative axial rake angle), as shown in FIG. 6. The magnitude of the positive inclination angle 126 depends on the first and second angles 116, 118 of the insert pocket 104, as well as the magnitude of the first angle 66 of the first portion 34a of the cutting edge 34. For example, the positive inclination angle 126 can be about six (6) degrees (i.e. a negative axial rake angle of about four (−4) degrees) when the first angle 116 is about four (4) degrees, the second angle 118 is about three (3) degrees, and the first angle 66 is about ten (10) degrees. The relatively large positive inclination angle 126 enables the milling cutter 100 to require lower power, while providing a smoother cutting operation as compared to conventional cutting inserts.

The patents and publications referred to herein are hereby incorporated by reference.

Having described presently preferred embodiments the invention may be otherwise embodied within the scope of the appended claims.

What is claimed is:

1. A cutting insert, comprising:
   a first surface and an opposing, second surface, the first and second surfaces are substantially identical to each other;
   four peripheral side surfaces extending entirely between the first and second surfaces, the four peripheral side surfaces are substantially identical to each other;
   four curved corners extending entirely between the first and second surfaces and adjacent peripheral side surfaces;
   four cutting edges formed at the intersection between the first surface and the peripheral side surfaces, and four cutting edges formed at the intersection between the second surface and the peripheral side surfaces, each cutting edge being divided into a first portion and a second portion with a radius blend separating the first and second portions,
   wherein the cutting insert is symmetric about a first central axis, A1, passing through the two opposing side peripheral surfaces, a second central axis, A2, passing through the other two opposing side peripheral surfaces, and a third central axis, A3, passing through the first and second surfaces, the first central axis, A1, being perpendicular to the second central axis, A2, and the third central axis, A3, being perpendicular to the first central axis A1 and to the second central axis, A2;
   wherein the first portion has a length, L1, and the second portion has a length, L2, that is shorter than the first portion such that the radius blend is not located at a midpoint of the cutting edge; and
   wherein the first portion of each cutting edge is disposed at an angle θ relative to the second portion of the respective cutting edge when measured along the peripheral side surface adjacent the respective cutting edge, θ being less than 180°.

2. The cutting insert of claim 1, wherein the first portion continuously slopes downward from the curved corner to the radius blend at a first angle with respect to the central axis, AI, and wherein the second portion continuously slopes upward from the radius blend to an opposite curved corner on the same peripheral side surface at a second angle with respect to the central axis, A1, and wherein the first angle is different than the second angle.

3. The cutting insert of claim 2, wherein the first angle is smaller in magnitude than the second angle.

4. The cutting insert of claim 3, wherein the first angle is in a range between five degrees to fifteen degrees, and the second angle is in a range between ten degrees to twenty degrees.

5. The cutting insert of claim 1, further comprising four curved, corner cutting edges formed at the intersection between the first surface and the curved corners, and four curved, corner cutting edges formed at the intersection between the second surface and the curved corners.

6. The cutting insert of claim 1, wherein the first and second surfaces include a countersunk bore extending entirely through the cutting insert.

7. The cutting insert of claim 6, further comprising a rake surface extending radially inward from each of the cutting edges, and a substantially planar seating surface extending continuously from the rake surface to the countersunk bore.

8. The cutting insert of claim 7, wherein the seating surface is lower in elevation than the rake surface such that a wall extends upward from the seating surface to the rake surface.

9. The cutting insert of claim 8, wherein the wall has a minimum height proximate the radius blend and a maximum height proximate the curved corners.

10. A milling cutter comprising a cutter body with a plurality of insert pockets, and a cutting insert of claim 1 seated in each of the insert pockets.

11. The milling cutter of claim 10, wherein each insert pocket includes a side wall, a rear wall and a bottom wall.

12. The milling cutter of claim 11, wherein the bottom wall is formed at a first angle with respect to an axis, A4, that is perpendicular to a center axis of rotation, R, of the milling cutter, and wherein the bottom wall is also formed at a second angle with respect to the center axis of rotation, R.

13. The milling cutter of claim 12, wherein the first angle is greater in magnitude than the second angle.

14. A cutting insert, comprising:
   a first surface and an opposing, second surface, the first and second surfaces are substantially identical to each other;
   four peripheral side surfaces extending entirely between the first and second surfaces, the four peripheral side surfaces are substantially identical to each other;

four curved corners extending entirely between the first and second surfaces and adjacent peripheral side surfaces;

four cutting edges formed at the intersection between the first surface and the peripheral side surfaces, and four cutting edges formed at the intersection between the second surface and the peripheral side surfaces, each cutting edge being divided into a first portion and a second portion with a radius blend separating the first and second portions;

a rake surface extending radially inward from each of the cutting edges; and a substantially planar seating surface, wherein the cutting insert is symmetric about a first central axis, A1, passing through the two opposing side peripheral surfaces, a second central axis, A2, passing through the other two opposing side peripheral surfaces, and a third central axis, A3, passing through the first and second surfaces, the first central axis, A1, being perpendicular to the second central axis, A2, and the third central axis, A3, being perpendicular to the first central axis A1 and to the second central axis, A2;

wherein the first portion has a length, L1, and the second portion has a length, L2, that is shorter than the first portion such that the radius blend is not located at a midpoint of the cutting edge;

wherein the first and second surfaces include a countersunk bore extending entirely through the cutting insert;

wherein the substantially planar seating surface extends continuously from the rake surface to the countersunk bore; and wherein the seating surface is lower in elevation than the rake surface such that a wall extends upward from the seating surface to the rake surface.

15. The cutting insert of claim 14, wherein the wall has a minimum height proximate the radius blend and a maximum height proximate the curved corners.

* * * * *